Oct. 12, 1937.  P. NIELSEN  2,095,396

MOUNTING FOR WINDSHIELD WIPER BLADES

Filed Aug. 13, 1936

Inventor
Peter Nielsen
By Arthur H. Sturges
Attorney

Patented Oct. 12, 1937

2,095,396

UNITED STATES PATENT OFFICE 2,095,396

MOUNTING FOR WINDSHIELD WIPER BLADES

Peter Nielsen, Omaha, Nebr., assignor to Jubilee Manufacturing Co., Omaha, Nebr., a corporation of Nebraska Application August 13, 1936, Serial No. 95,798

2 Claims. (Cl. 15—250)

The present invention relates to windshield wipers and has for an object to provide a novel construction of adapter by means of which windshield wiper blades of various conventional constructions may be quickly mounted on the usual type of motor arm which springs back and forth over the windshield.

Another object of the invention is to provide a plate attaching device which may be made from one piece of wire suitably bent to shape and thus be cheap and easy to manufacture.

The invention also provides an adapter of this character which when once in position is securely interlocked so that it cannot be detached by vibration of the automobile or incident to the violent oscillation of the blade during use.

It is well known that windshield cleaners are provided with motors of various types which have swinging or oscillating arms, spring pressed toward the surface of the windshield, and that the free ends of these arms are constructed in various ways to detachably interlock with and support wiper blades. As different makes of windshield cleaners have attaching means of different constructions, and as wiper blades are independently manufactured and have various detail structural features to cooperate with the corresponding oscillating arms of the motors, considerable difficulty is encountered at times when the wiper blades available are not adapted for application to the motor arm requiring the new wiper blade.

A further object of the invention, therefore, is to provide an adapter which may be quickly and easily secured to oscillating arms of various construction and which also may be detachably secured to wipers of various constructions so that the adapter may be carried in stock instead of carrying a large assortment of wipers of different constructions for the different types of oscillating arms.

The invention also claims to provide an adapter which may be secured upon the oscillating arm, the adapter interlocking with a wiper blade by the swinging of the wiper blade into angular relation with respect to the arm so that the wiper blade may be quickly and easily interchanged upon the arm end so that the wiper blade may be swung upon the arm to engage one end of the wiper blade against the windshield and thus hold the arm and the wiper in position to admit of the quick and easy cleaning of the windshield glass.

With the foregoing and other objects in view, the invention will be more fully described hereinafter, and will be more particularly pointed out in the claims appended hereto.

In the drawing, wherein like symbols refer to like or corresponding parts throughout the several views.

Figure 1:
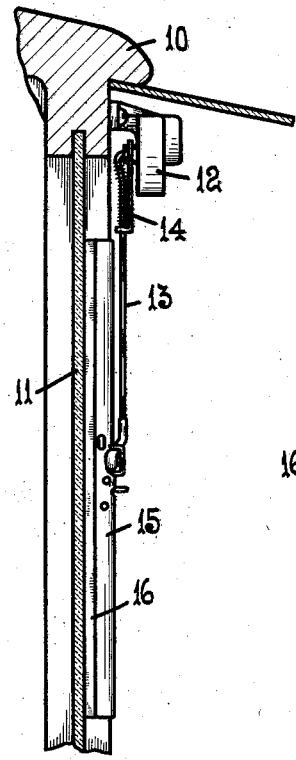
Figure 1 is a fragmentary vertical section taken through the windshield portion of a motor vehicle body showing a windshield cleaner mounted thereon and provided with the adapter of this invention.
Figure 2:
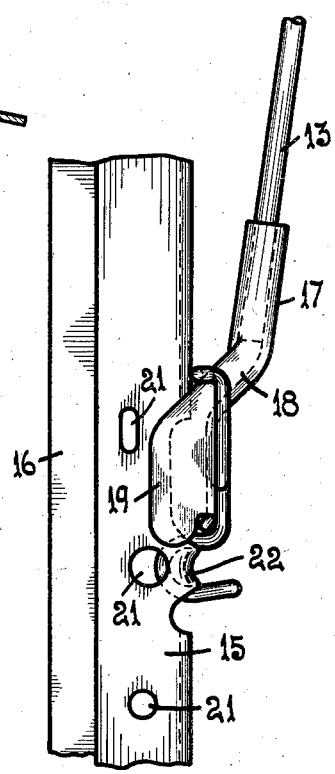
Figure 2 is a fragmentary enlarged side elevation of the wiper blade and supporting arm with the adapter interconnecting the same.
Figure 3:
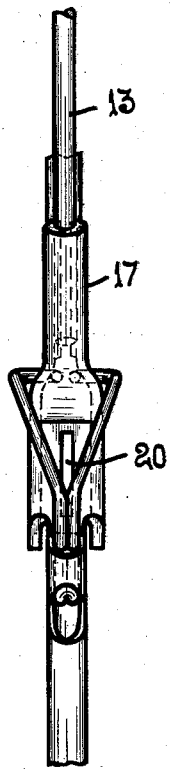
Figure 3 is an outer edge view thereof.

With reference first to Figure 1, 10 designates the front wall of a motor vehicle provided with a windshield glass 11 and which supports a windshield motor 12 which may be of any suitable construction and operated either by suction, electricity or the like. The motor 12 carries the usual oscillating arm 13 which is normally urged toward the glass 11 by a spring 14 in the usual manner, and the free end of the arm 13 carries a wiper blade 15 having a substantially U-shaped back portion and flexible strips 16 clamped therein and projecting from the back portion to wipe over the surface of the glass 11. As shown particularly in Figures 2, 3 and 4 some types of the operating arms 13 are provided on their ends with a sleeve 17 which is offset inwardly at 18, which is constructed of sheet metal and which has its lateral edges rolled or bent inwardly toward the glass and which terminates in spaced flanges 19 adapted to engage against the opposite sides of the windshield wiper 15. The flanged portion 19 of the sleeve is disposed at a slight angle to the axis of the arm 13 to press the wiper blade uniformly against the pane of glass 11 and offset any tilting action which might occur on account of the inclined portion of the arm 13. In this type of connector, the flanged portion 19 is provided at its outer side or web with a longitudinal slot 20 for receiving a projection or the like which is carried by some types of windshield wipers.

It will also be noted that the windshield wiper 15, which as shown is of conventional construction, is provided with variously positioned and proportioned openings 21 adapted to receive bolts and other devices which are employed in different types of connecting means between the wiper blade 15 and the arm 13.

However, in nearly all cases the conventional wiper blades 15 are provided with eye portions 22 which are formed in the back of the blade 15 and adapted to receive an outwardly opening hook formed upon the free ends of other types of supporting arms 13.

As the eye 22 is in nearly all cases used in wiper blade constructions, the adapter of this invention is for use with wiper blades 15 having the eyes 22.

Figure 5:
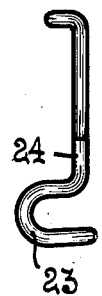
Figure 5 is an edge view of the adapter.
Figure 6:
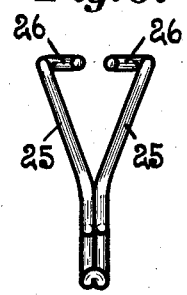
Figure 6 is a front elevation of the same.
Figure 7:
Figure 7 is a top plan view thereof.

Referring now particularly to Figures 5, 6 and 7, the adapter comprises a single length of wire which is overturned upon itself and bent into the form of an open hook 23 of double thickness and which at its upper side merges into a shank 24 also of double thickness. The ends of the length of wire at the top of the shank 24 are diverged upwardly to provide resilient gripping arms 25 and the upper ends of the arms 25 terminate in horizontally disposed hooks 26 which are offset backwardly with respect to the open hook 23 and which have the free ends of the wire directed forwardly and inwardly in convergent relation to provide gripping jaws 27.

The adapter is fitted to the lower portion of the sleeve 19 by disposing the divergent spring arms 25 across the outer face of the flanged portion 19. The adapter has its upper end hooks 26 engaging about the sides of the offset portion 18 and with the jaws 27 engaging in the hollow underside of the offset portion 18 to thus rigidly hold the adapter from longitudinal shifting on the arm 13.

Figure 4:
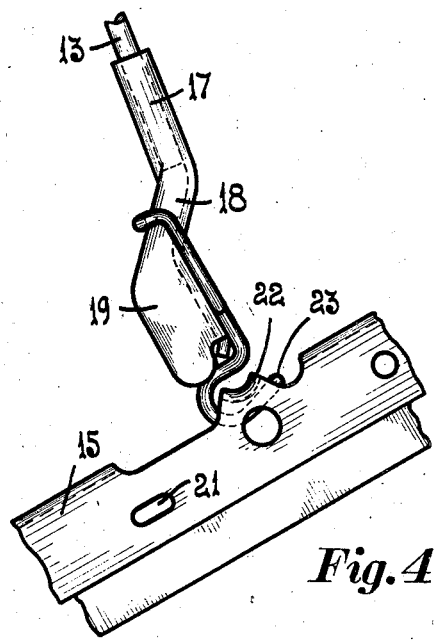
Figure 4 is a side elevation of the same showing the wiper blade turned at substantially right angles to the arm for adjustment and removal.

The lower end of the adapter has the hook 23 extending backwardly and slightly between the flanges 19. The hook 23 is adapted to engage in the eye 22 of the wiper blade by swinging the latter at right angles to the arm 13 as shown in Figure 4 so that the eye 22 may be engaged over the hook 23. The wiper blade 15 is now swung into substantially parallel relation at the rear side of the arm 13 so as to turn the eye 22 into the closed end of the hook 23 and thus securely interlock the wiper upon the arm.

The adapter is made of wire, is inexpensive and easy to handle and may be quickly and easily placed upon supporting arms 13 so that a new wiper blade 15 may be readily attached to the arm by use of the adapter.

It is apparent that the wiper blade may be quickly and easily interchanged upon the arm by use of the adapter, and the spring arms 25 of the adapter are of sufficient strength to firmly clamp the adapter in place.

It is obvious that various changes and modifications may be made in the details of construction and design of the above specifically described embodiment of this invention without departing from the spirit thereof, such changes and modifications being restricted only by the scope of the following claims.

What is claimed is:

1. A connecting adapter for use between the arm and wiper blade of a windshield wiper comprising a single length of wire overturned upon itself and bent to provide a hook at its overturned portion and a shank leaning upwardly from the hook, the ends of the wire at the top of the shank diverging upwardly to provide a pair of spring arms for engagement about the end portion of a windshield wiper arm, the free ends of the length of wire being rolled over inwardly toward each other at the top of the arms for engagement about the windshield wiper arm to bind the adapter thereto, said hook of the adapter adapted for detachable engagement with the wiper blade.

2. A device for connecting wiper blades to the arms of windshield wipers, comprising a single length of wire overturned upon itself and bent at its closed end into a substantially horizontal hook and having a double thick shank extending from the forward upper portion of the hook, the ends of the wire diverging upwardly from the shank and having the extremities of the wire rolled inwardly and backwardly in the direction of same hook to provide clamps on the free ends of the wire, the diverging portions of the wire adapted to engage across the outer side of a windshield arm and with the jaws engaging behind the arm to hold the device to the arm, said hook of the device adapted for detachable engagement with the back of a wiper blade.

PETER NIELSEN.